(12) United States Patent
Zhao et al.

(10) Patent No.: US 12,072,578 B2
(45) Date of Patent: Aug. 27, 2024

(54) BACKLIGHT MODULE AND DISPLAY DEVICE

(71) Applicant: Lenovo (Beijing) Limited, Beijing (CN)

(72) Inventors: Zhenyuan Zhao, Beijing (CN); Yi-Teng Wang, Beijing (CN); Wei Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/692,137

(22) Filed: Mar. 10, 2022

(65) Prior Publication Data

US 2023/0097447 A1 Mar. 30, 2023

(30) Foreign Application Priority Data

Sep. 28, 2021 (CN) .......................... 202111143858.X

(51) Int. Cl.
*G02F 1/1335* (2006.01)
*G02F 1/13357* (2006.01)

(52) U.S. Cl.
CPC .. *G02F 1/133614* (2021.01); *G02F 1/133603* (2013.01); *G02F 1/133607* (2021.01); *G02F 1/133611* (2013.01)

(58) Field of Classification Search
CPC ......... G02F 1/133614; G02F 1/133611; G02F 1/133603; G02F 1/133607; G02F 1/133606
See application file for complete search history.

(56) References Cited

U.S. PATENT DOCUMENTS

| 11,333,924 B1* | 5/2022 | Lv ..................... G02F 1/133614 |
| 2016/0085109 A1* | 3/2016 | Baek .................... G02B 6/0088 |
| | | 362/607 |

(Continued)

FOREIGN PATENT DOCUMENTS

| CN | 104865749 A | 8/2015 | |
| CN | 104865749 B | * 11/2017 | ........... G02F 1/1336 |

(Continued)

*Primary Examiner* — Erin Kryukova
(74) *Attorney, Agent, or Firm* — ANOVA LAW GROUP, PLLC

(57) ABSTRACT

A backlight module. The backlight module includes a backplane, a backlight light source, a first light conversion layer, and a first light leveling layer. The backplane includes a receiving space, and the backlight light source is fixed on a first inner surface of the receiving space. The first light conversion layer is positioned on the light emitting side of the backlight light source, and there is a first distance between the first light conversion layer and a second inner surface of the receiving space. The first inner surface and the second inner surface intersect to form a right angle. The first light leveling layer is positioned on the side of the first light conversion layer away from an outer surface of the backlight light source. A second light conversion layer is laid on a first target area of the first light leveling layer, and a projection area of the second light conversion layer on the first inner surface covers a projection area of a first area of the first light conversion layer on the first inner surface. A light conversion function of a second area of the first light conversion layer is stronger than the light conversion function of the first area, and the second area includes an area of the first light conversion layer that is different from the first area.

19 Claims, 4 Drawing Sheets

(56) References Cited

U.S. PATENT DOCUMENTS

2016/0377786 A1* 12/2016 Ham .................... G02B 6/0055
                                                                                     349/65
2018/0173054 A1* 6/2018 Peng ..................... G02F 1/017
2019/0285944 A1* 9/2019 Liu ................... G02F 1/133609

FOREIGN PATENT DOCUMENTS

| CN | 107340638 A | * | 11/2017 | ....... G02F 1/133603 |
|----|-------------|---|---------|----------------------|
| CN | 109343278 A | * | 2/2019 | |
| CN | 109491143 A | * | 3/2019 | ........... G02F 1/1336 |
| CN | 109521604 A | * | 3/2019 | ....... G02F 1/133514 |

\* cited by examiner

BACKLIGHT MODULE AND DISPLAY DEVICE

CROSS-REFERENCES TO RELATED APPLICATION

This application claims priority to Chinese Patent Application No. 202111143858.X filed on Sep. 28, 2021, the entire content of which is incorporated herein by reference.

FIELD OF TECHNOLOGY

The present disclosure relates to the field of display technology and, more specifically, to a backlight module and a display device.

BACKGROUND

Many liquid crystal displays use light-emitting diodes (LEDs) as the backlight source, and there are two types of LED backlight sources, namely, the edge lit LED and the direct lit LED. The edge lit LED is currently the mainstream for medium-sized LCD screens due to its lightness and thinness, while the direct lit LED is being gradually adopted due to its higher backlight brightness and higher dynamic contract ratio. Direct lit LED LCD screens generally use millimeter LED (miniLED) backlights, and the miniLED backlights have the issue of non-white light on four sides. In conventional technology, the failure area of the light conversion layer is made as narrow as possible. However, this design cannot fundamentally address the non-white light issue described above.

BRIEF SUMMARY OF THE DISCLOSURE

One aspect of the present disclosure provides a backlight module. The backlight module includes a backplane, a backlight light source, a first light conversion layer, and a first light leveling layer. The backplane includes a receiving space, and the backlight light source is fixed on a first inner surface of the receiving space. The first light conversion layer is positioned on the light emitting side of the backlight light source, and there is a first distance between the first light conversion layer and a second inner surface of the receiving space. The first inner surface and the second inner surface intersect to form a right angle. The first light leveling layer is positioned on the side of the first light conversion layer away from an outer surface of the backlight light source. A second light conversion layer is laid on a first target area of the first light leveling layer, and a projection area of the second light conversion layer on the first inner surface covers a projection area of a first area of the first light conversion layer on the first inner surface. A light conversion function of a second area of the first light conversion layer is stronger than the light conversion function of the first area, and the second area includes an area of the first light conversion layer that is different from the first area.

Another aspect of the present disclosure provides a display device. The display device includes a backlight module and a liquid crystal display module disposed on the backlight module. The backlight module includes a backplane, a backlight light source, a first light conversion layer, and a first light leveling layer. The backplane includes a receiving space, and the backlight light source is fixed on a first inner surface of the receiving space. The first light conversion layer is positioned on the light emitting side of the backlight light source, and there is a first distance between the first light conversion layer and a second inner surface of the receiving space. In some embodiments, the first inner surface and the second inner surface may intersect to form a right angle. The first light leveling layer is positioned on the side of the first light conversion layer away from an outer surface of the backlight light source. A second light conversion layer is laid on a first target area of the first light leveling layer, and a projection area of the second light conversion layer on the first inner surface covers a projection area of a first area of the first light conversion layer on the first inner surface. A light conversion function of a second area of the first light conversion layer is stronger than the light conversion function of the first area, and the second area includes an area of the first light conversion layer that is different from the first area.

BRIEF DESCRIPTION OF THE DRAWINGS

To more clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

The terms "first," "second," or the like in the specification, claims, and the drawings of the present disclosure are merely used to distinguish similar elements, and are not intended to describe a specified order or a sequence. The involved elements may be interchangeable in any suitable situation, so that the present disclosure can be performed in the order or sequence different from that shown in the figures or described in the specification. In addition, the terms "including," "comprising," and variations thereof herein are open, non-limiting terminologies, which are meant to encompass a series of steps of processes and methods, or a series of units of systems, apparatus, or devices listed thereafter and equivalents thereof as well as additional steps of the processes and methods or units of the systems, apparatus, or devices.

Figure 1:
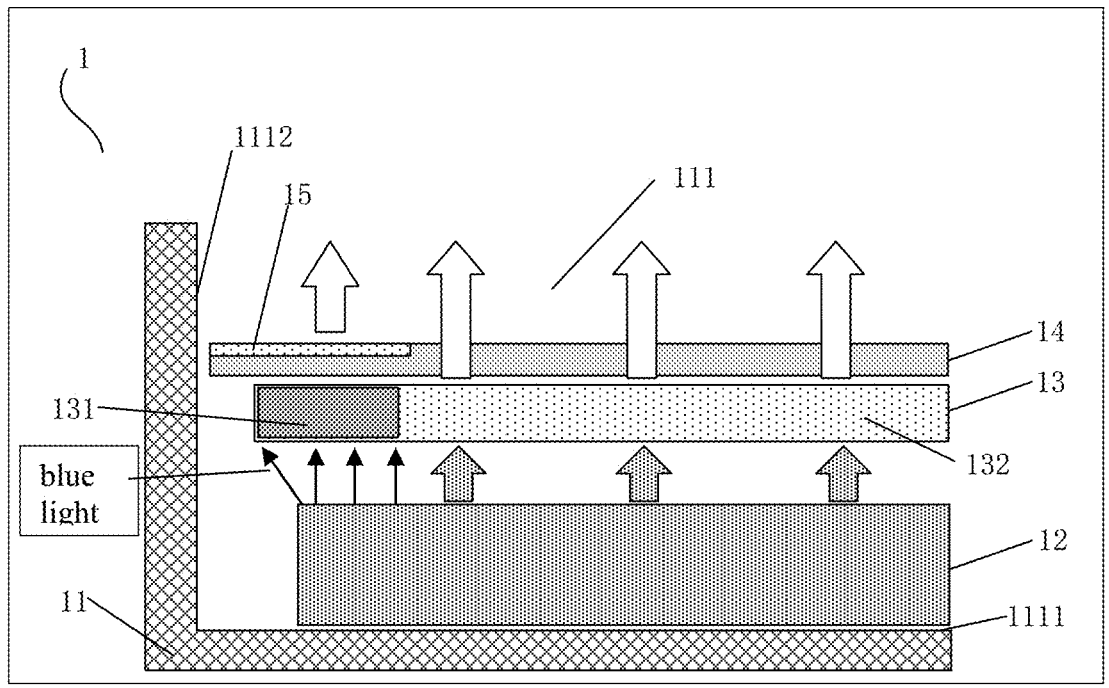
FIG. 1 is a schematic structural diagram of a backlight module according to an embodiment of the present disclosure.

An embodiment of the present disclosure provides a backlight module. FIG. 1 is a schematic structural diagram of a backlight module 1 according to an embodiment of the present disclosure. As shown in FIG. 1, the backlight module 1 includes a backplane 11, a backlight light source 12, a first light conversion layer 13, and a first light leveling layer 14. The backplane 11 includes a receiving space 111, and the backlight light source 12 is fixed on a first inner surface 1111 of the receiving space 111. The first light conversion layer 13 is positioned on the light emitting side of the backlight light source 12, and there is a first distance between the first light conversion layer 13 and a second inner surface 1112 of the receiving space 111. In some embodiments, the first inner surface 1111 and the second inner surface 1112 may intersect to form a right angle. The first light leveling layer 14 is positioned on the side of the first light conversion layer 13 away from an outer surface of the backlight light source 12. A second light conversion layer 15 is laid on a first target area of the first light leveling layer 14. A projection area of the second light conversion layer 15 on the first inner surface 1111 covers a projection area of a first area 131 of the first light conversion layer 13 on the first inner surface 1111. The light conversion function of a second area 132 of the first light conversion layer 13 may be stronger than the light conversion function of the first area 131, and the second area 132 may include a different area from the first area 131 in the first light conversion layer 13.

In the embodiments of the present disclosure, the backplane 11 may include a receiving space 111. The receiving space 111 may be used to receive at least the backlight light source 12, the first light conversion layer 13, the first light leveling layer 14, and the second light conversion layer 15 included in the backlight module 1.

In some embodiments, the backlight light source 12 may be a light source of any color. For example, the backlight light source 12 may be a blue light source, and the backlight light source 12 may also be a light source of other colors, which is not limited in present disclosure. Further, the backlight light source 12 may be a millimeter light-emitting diode (miniLED). The backlight light source 12 may be a granular light source.

In some embodiments, the backlight light source 12 may be fixed on the first inner surface 1111 of the receiving space 111 by means of curing agent bonding. The curing agent may include, but is not limited to, roll-shaped adhesive tapes, fixing tapes, and double-sided tapes. The backlight light source 12 may also be fixed on the first inner surface 1111 of the receiving space 111 by means of screws, which is not limited in the present disclosure.

In the embodiments of the present disclosure, the first light conversion layer 13 can be used to convert the light projected by the backlight light source 12 into white light through the photoluminescence effect, that is, the first light conversion layer 13 has a light conversion function. In some embodiments, the light conversion function may also be referred to as the color gamut conversion function. The first light conversion layer 13 may be a quantum dot film, and the first light conversion layer 13 may also be a sealed phosphor coating. The following takes the first light conversion layer 13 as a quantum dot film as an example for description. A quantum dot film can be formed by dispersing the quantum dots on a resin material to form the film. The film can be encapsulated with two high-resistance water vapor films to form a multi-layer composite structure. Quantum dots are nano-scale semiconductors that emit light of a specific frequency when a certain electric field or light pressure is applied to the nano-semiconductor material. The frequency of the emitted light will change with the size of the semiconductor. Therefore, the color of the emitted light can be controlled by adjusting the size of the nano-semiconductor. Since this nano-semiconductor has the property of confining electrons and electron holes, which is similar to atoms or molecules in nature, it is called a quantum dot.

It should be noted that the optical principle of quantum dots is that the smaller the quantum dot, the shorter the wavelength can be generated, and the larger the quantum dot, the longer the wavelength can be generated. The desired light wavelength can be obtained by exchanging the wavelength mark of the light projected by the backlight source. A single quantum dot can emit light with a narrow spectrum or relatively long wavelength by absorbing light of short wavelength. By prepared and assembling quantum dots of the same size, a luminescent pink with high color purity and sharp spectrum may be obtained, which can realize and improve color reproducibility and reduce power consumption.

In the embodiments of the present disclosure, the first light conversion layer 13 may have an expansion and contraction rate. A first distance may be set between the first light conversion layer 13 in the backlight module 1 and the second inner surface 1112 of the receiving space 111 to avoid light conversion failure of the first light conversion layer 13 due to expansion and contraction rate. For example, the first distance may be 0.3 millimeter (mm), the first distance may also be 0.4 mm, and the first distance may also be between 0.3 mm and 0.4 mm.

It should be noted that, when the first light conversion layer is a quantum dot film, on one hand, since the expansion and contraction rate of the quantum dot film is relatively large, if the first distance is not set between the quantum dot film and the second inner surface 1112 of the receiving space 111, the quantum dot film may curl due to the thermal expansion effect of the quantum dot film and there may be a gap, that is, a failure area, which causes the conversion failure when light passes through the failure area. On the other hand, since the particle size of the quantum dots is between 1 and 10 nm, the surface area is large, which causes oxygen and water vapor to easily damage the surface of the quantum dots, resulting in the failure of the color gamut conversion function of the destroyed quantum dots. That is, there is a failure area in the quantum dot film, which results in the conversion failure when light passes through the failure area.

In the embodiments of the present disclosure, the first light leveling layer 14 may be used to convert the granular light source into a surface light source. Subsequently, the first light leveling layer 14 may serve the role of light mixing and light leveling. In some embodiments, the first light leveling layer 14 may be a light splitting film.

In the embodiments of the present disclosure, the second light conversion layer 15 may be used to convert the light projected by the backlight light source 12 and passing through the first area 131 of the first light conversion layer 13 into white light through the photoluminescence effect, thereby enhancing the brightness of the display and further reducing light leakage. The second light conversion layer 15 may be a phosphor coating, and the second light conversion layer 15 may also be a quantum dot film coating. The second light conversion layer 15 may have an expansion and contraction rate. Therefore, a reserved distance may be set between the second light conversion layer 15 in the backlight module 1 and the second inner surface 1112 of the receiving space 111 to avoid the light conversion failure of the second light conversion layer 15 due to the expansion and contraction rate.

In the embodiments of the present disclosure, the first area 131 of the first light conversion layer 13 can be regarded as a failure area. In some embodiments, the projection area of the second light conversion layer 15 being laid on the first target area of the first light leveling layer 14 on the first inner surface 1111 to cover the projection area of the first area 131 of the first light conversion layer 13 on the first inner surface 1111 may be understood as the first target area is positioned directly above the failure area, and the projection area of the first target area on the first inner surface 1111 is greater than or equal to the projection area of the failure area of the first light conversion layer 13 on the first inner surface 1111.

In the embodiments of the present disclosure, the first light conversion layer 13 may include a first area 131 and a second area 132, and the first light conversion layer 13 may have a light conversion function. Snice the first area 131 is a failure area and the second area 132 includes a different area from the first area 131 in the first light conversion layer 13, the second area 132 may be an effective area with a light conversion function. Therefore, the light conversion function of the second area 132 of the first area 131 may be stronger than the light conversion function of the first area 131.

Consistent with the present disclosure, the backlight module 1 includes a backplane 11, the backplane 11 including the receiving space 111; a backlight light source 12, the backlight light source 12 being fixed on the first inner surface 1111 of the receiving space 111; a first light conversion layer 13, the first light conversion layer 13 being positioned on the light emitting side of the backlight light source 12, and a first distance being set between the first light conversion layer 13 and the second inner surface 1112 of the receiving space 111. In some embodiments, the intersection of the first inner surface 1111 and the second inner surface 1112 may form a right angle. The backlight module 1 further includes a first light leveling layer 14, the first light leveling layer 14 being positioned on the side of the first light conversion layer 13 away from the outer surface of the backlight light source 12. In some embodiments, the projection area of the second light conversion layer 15 on the first inner surface 1111 may cover the projection area of a first area 131 of the first light conversion layer 13 on the first inner surface 1111. The light conversion function of the second area 132 of the first light conversion layer 13 may be stronger than the light conversion function of the first area 131, and the second area 132 may include a different area from the first area 131 in the first light conversion layer 13. In this way, when the light projected by the backlight light source 12 passes through the first area 131 of the first light conversion layer 13, that is, when the light projected by the backlight light source 12 passes through the failure area of the first light conversion layer 13, the second light conversion layer 15 can be used to convert the unconverted light passing through the failure area into white light through the second light conversion layer 15. Further, the first light leveling layer 14 can be used to uniformly distribute the light, thereby solving the issue of non-white light on four sides of the backlight in conventional technology and the issue of making the failure area of the light conversion layer as narrow as possible. In this way, uniform lighting and uniform brightness in the visible area can be realized, light leakage can be avoided, and the display effect can be improved.

Figure 2:
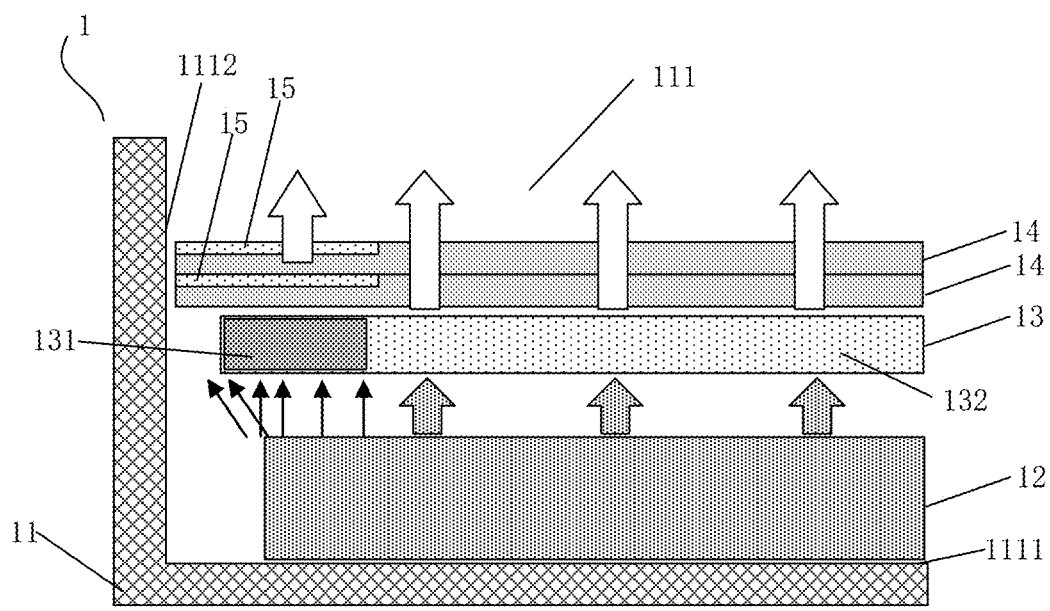
FIG. 2 is a schematic structural diagram of the backlight module according to an embodiment of the present disclosure.

FIG. 2 is a schematic structural diagram of the backlight module according to an embodiment of the present disclosure. As shown in FIG. 2, the first light leveling layer 14 is multi-layered. In some embodiments, the first target area of each layer of the first light leveling layer 14 may be covered with the second light conversion layer 15.

In the embodiments of the present disclosure, the backlight module 1 may include the receiving space 111. The receiving space 111 may be used to receive the backlight light source 12, the first light conversion layer 13, the multi-layer first light leveling layer 14, and a multi-layer second light conversion layer 15.

In the embodiments of the present disclosure, the first light leveling layer 14 may be a single layer, or the first light leveling layer 14 may be multi-layered, and the first target area of each layer of the first light leveling layer 14 may be covered with the second light conversion layer 15. In this way, when the light projected by the backlight light source 12 passes through the failure area of the first light conversion layer 13, there can be a plurality of second light conversion layers 15. The plurality of second light conversion layers 15 can better mix the unconverted direct light passing through the failure area and the reflected light generated based on the first distance into white light through the plurality of second light conversion layers 15. Further, the plurality of first light leveling layers 14 may be used to more uniformly distribute the light, thereby further improving the display effect. It should be noted that the number of layers of the first light leveling layer 14 may be set based on the actual requirements, thereby ensuring that the light projected by the backlight light source 12 can be betted mixed into white light. For example, as shown in FIG. 2, there are two layers of the first light leveling layer 14, and the first target area of each layer of the first light leveling layer 14 is covered with the second light conversion layer 15.

In some embodiments, the backlight light source 12 may include a blue light source, the second light conversion layer 15 may include a red and green phosphor coating or a quantum dot film coating, and the first light conversion layer 13 may be a quantum dot film.

In some embodiments, the red and green phosphor coatings or the quantum dot film coatings may convert the blue light projected by the blue light source into white light.

In some embodiments, referring to FIG. 1 and FIG. 2, the backlight module 1 may include a blue light miniLED, that is, the blue light miniLED may provide the blue light source. When the blue light source passes through the first light conversion layer 13 such as the quantum dot film, the blue light may be converted into white light. When the quantum dot film has a failure area, the blue light passing through the quantum dot film, that is, the direct blue light, and/or the reflected blue light generated based on the first distance, may again pass through the first light leveling layer 14 such as the light splitting film and the second light conversion layer 15 such as the red and green phosphor coating or the quantum dot film coating, resulting in a photoluminescence effect to obtain white light. The first light leveling layer 14 may be a single layer, or the first light leveling layer 14 may be multi-layered. Further, the light distribution can be uniform by using the light splitting film, which ensures uniform light and uniform brightness in the visible area, avoids light leakage, and improves the display effect.

Figure 3:
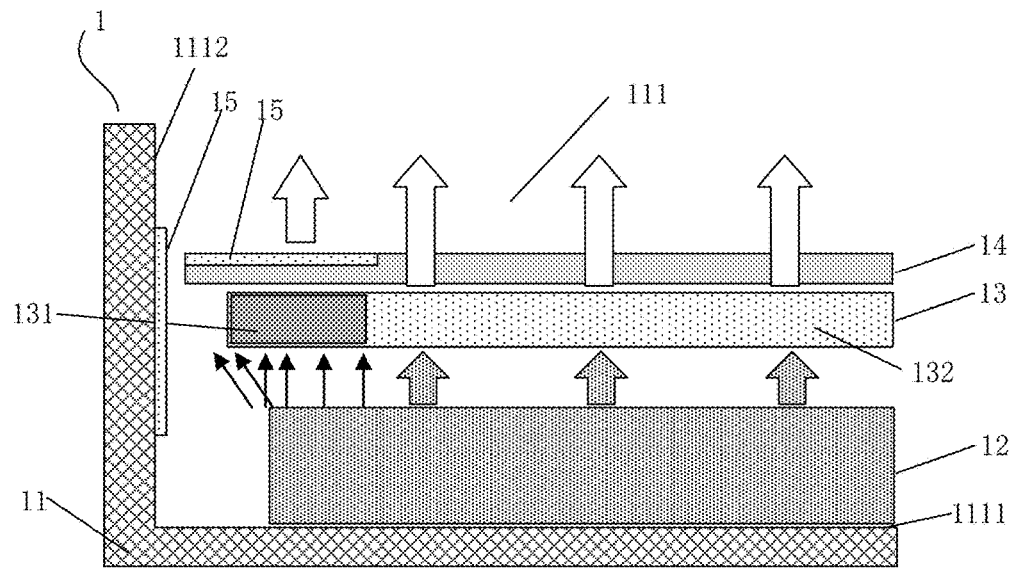
FIG. 3 is a schematic structural diagram of the backlight module according to an embodiment of the present disclosure.

FIG. 3 is a schematic structural diagram of the backlight module according to an embodiment of the present disclosure. As shown in FIG. 3, the second light conversion layer 15 is disposed on the second inner surface 1112.

In the embodiments of the present disclosure, the backlight module 1 may include the receiving space 111. The receiving space 111 may be used to receive the backlight light source 12, the first light conversion layer 13, the first light leveling layer 14, and a plurality of second light conversion layers 15.

In some embodiments, as shown in FIG. 3, the backlight module 1 may include a blue light miniLED, that is, the blue light miniLED may provide the blue light source. When the blue light source passes through the first light conversion layer 13 such as the quantum dot film, the blue light may be converted into white light. When the quantum dot film has a failure area, the blue light passing through the quantum dot film, that is, the direct blue light, may pass through the second light conversion layer 15 of the first light leveling layer 14 again to generate a photoluminescence effect to obtain white light. Based on the reflected blue light generated by the first distance, a photoluminescence effect may occur through the second light conversion layer 15 laid on the second inner surface 1112 to obtain white light. Further, the first light leveling layer 14 may be used to uniformly distribute light. In this way, both direct blue light and reflected blue light can be converted in white light, and the uniform light and uniform brightness of the visible area can be ensured and light leakage can be avoided, thereby improving the display effect.

Figure 4A:
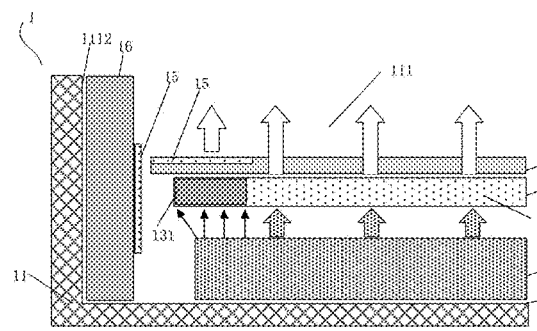
FIG. 4A is a schematic structural diagram of the backlight module according to an embodiment of the present disclosure.

FIG. 4A is a schematic structural diagram of the backlight module according to an embodiment of the present disclosure. As shown in FIG. 4A, the backlight module 1 further includes a plastic frame 16. The plastic frame 16 is fixed on the second inner surface 1112, and the second light conversion layer 15 is laid on the side of the plastic frame 16 away from the receiving space 111.

In the embodiments of the present disclosure, the backlight module 1 may include the receiving space 111. The receiving space 111 may be used to receive the backlight light source 12, the first light conversion layer 13, the first light leveling layer 14, the plurality of second light conversion layers 15, and the plastic frame 16.

In the embodiments of the present disclosure, the plastic frame 16 may be used to protect and support at least some components in the receiving space 111. For example, a number of snap connectors (not shown in the accompanying drawings) are generally arranged on the plastic frame 16, and at least part of the components in the receiving space 111 may be provided with connection notches adapted to the snap connectors. The snap connectors may connect with the connection notches, thereby ensuring the stability of the backlight module.

The plastic frame 16 may be fixed on the second inner surface 1112 of the receiving space 111 by bonding with a curing agent. In some embodiments, the curing agent may include, but is not limited to, roll-shaped adhesive tapes, fixing tapes, and double-sided tapes. The plastic frame 16 may also be fixed on the second inner surface 1112 of the receiving space 111 by means of screws, which is not limited in the present disclosure.

In some embodiments, the material of the plastic frame 16 may be polycarbonate.

Consistent with the present disclosure, the plastic frame 16 can be fixed on the second inner surface 1112, and the second light conversion layer 15 can be laid on the side of the plastic frame 16 away from the receiving space 111. In this way, when the light projected by the backlight light source 12 passes through the failure area of the first light conversion layer 13, the plurality of second light conversion layers 15 can better mix the unconverted direct light passing through the failure area into white light through the plurality of second light conversion layers 15 in the first light leveling layer. Further, the reflected light generated based on the first distance can be further mixed into white light by the plurality of second light conversion layers 15 laid on the plastic frame 16. In addition, the first light leveling layer 14 can be used to make the light distribution more uniform, ensures the uniform light and uniform brightness in the visible area, and avoids light leakage, thereby improving the display effect.

Figure 4B:
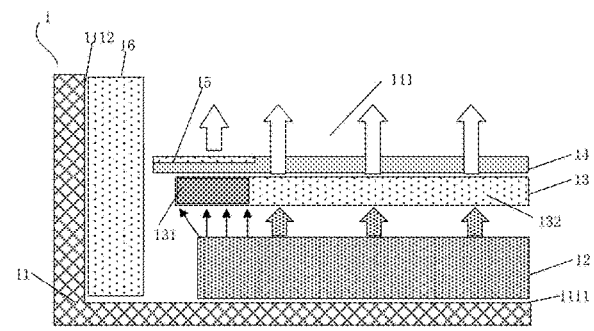
FIG. 4B is a schematic structural diagram of the backlight module according to an embodiment of the present disclosure.

FIG. 4B is a schematic structural diagram of the backlight module according to an embodiment of the present disclosure. As shown in FIG. 4B, the backlight module 1 further includes a plastic frame 16. The plastic frame 16 is fixed on the second inner surface 1112. The plastic frame 16 may be made of a color masterbatch material capable of converting the color of the backlight light source into white light.

In the embodiments of the present disclosure, the material of the plastic frame 16 may be a polycarbonate material made of a color masterbatch that can convert the color of the backlight light source into white light, and the material of the plastic frame 16 may also be a quantum dot material that can convert the backlight light source into white light. The present disclosure does not limit the material of the plastic frame 16. For example, when the backlight light source is a blue light source, the material of the plastic frame 16 may be polycarbonate material made of yellow masterbatch, and the material of the plastic frame 16 may also be made of yellow quantum dot material. In this way, the entire plastic frame 16 can be yellow. When the blue light projected by the blue light source is irradiated on the yellow plastic frame 16, the blue light may be converted into white light through the reflection of the yellow plastic frame 16, thereby further improving the display effect and avoiding blue light leakage.

Figure 5:
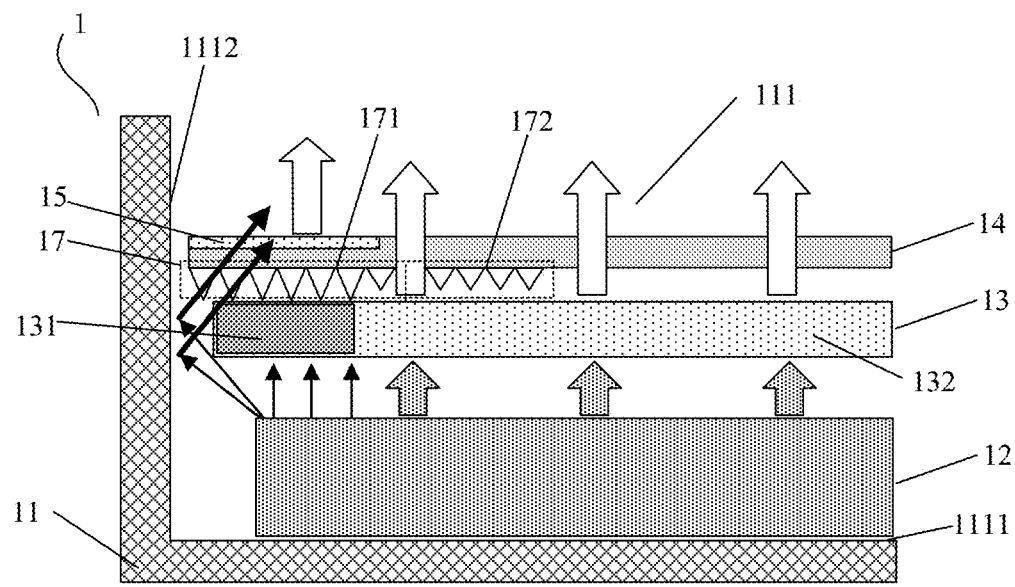
FIG. 5 is a schematic structural diagram of the backlight module according to an embodiment of the present disclosure.

FIG. 5 is a schematic structural diagram of the backlight module according to an embodiment of the present disclosure. As shown in FIG. 5, a microstructure light-condensing element 17 is fixed on the side of the first light leveling layer 14 close to the first light conversion layer 13. The light-condensing function of a first part 171 of the microstructure light-condensing element 17 may be stronger than the light-condensing function of a second part 172 of the microstructure light-condensing element 17. In some embodiments, the distance between the first part 171 and the second inner surface 1112 may be shorter than the distance between the second part 172 and the second inner surface 1112.

In the embodiments of the present disclosure, the backlight module 1 may include the receiving space 111. The receiving space 111 may be used to receive the backlight light source 12, the first light conversion layer 13, the first light leveling layer 14, the second light conversion layer 15, and the microstructure light-condensing element 17.

In the embodiments of the present disclosure, the microstructure light-condensing element 17 can be disposed on the side of the first light leveling layer 14 close to the first light conversion layer 13. The microstructure light-condensing element 17 may include a light-receiving surface and a light-emitting surface, and the microstructure light-condensing element 17 may be used to change the light path of the light entering from the light-receiving surface and focus on the light-emitting surface.

In the embodiments of the present disclosure, the microstructure light-condensing element 17 may be a prism, and the microstructure light-condensing element 17 may also be mixed particles, which is not limited in the embodiments of the present disclosure, as long as a higher conversion efficiency of light intensity can be achieved to obtain uniformity of light.

Consistent with the present disclosure, the microstructure light-condensing element 17 can include the first part 171 and the second part 172, and the light condensing function of the first part 171 can be stronger than the light condensing function of the second part 172. In some embodiments, the distance between the first part 171 and the second inner surface 1112 may be shorter than the distance between the second part 172 and the second inner surface 1112. It should be noted that, generally, after the light with the same light intensity projected by the backlight light source 21 passes through the edge area and the center area of the first light conversion layer 13 respectively, the light intensity of the white light passing through the edge area is different from the light intensity of the white light passing through the center area. In this way, the light intensity of the white light in the edge area where the distance from the second inner surface 1112 is within a distance threshold range may be weaker than the light intensity of the white light in the center area where the distance from the second inner surface 1112 exceeds the distance threshold, which can result in inconsistency in the brightness of the edge area and the center area. Therefore, there is a need to set the light condensing function of the first part 171 of the microstructure light-condensing element 17 corresponding to the area where the edge light is positioned to be stronger than the light-condensing function of the second part 172 of the microstructure light-condensing element 17 corresponding to the area where the center light is positioned. In this way, the first light leveling layer can be used to address the inconsistency in brightness between the edge area and the center area through the microstructure light-condensing element 17 and realize the uniformity of light, which further ensures the uniform light and brightness in the visible area and avoids light leakage, thereby improving the display effect.

In some embodiments, the microstructure light-condensing element 17 may be a prism, and the size of the protrusion of the first part 171 of the prism may be larger than the protrusion of the second part 172 of the prism. In this way, the light-condensing function of the first part 171 of the prism can be stronger than the light-condensing function of the second part 172 of the prism, and the first light leveling layer 14 can realize light uniformity, thereby ensuring uniform light and uniform brightness in the visible, avoiding light leakage, and improving the display effect.

Figure 6:
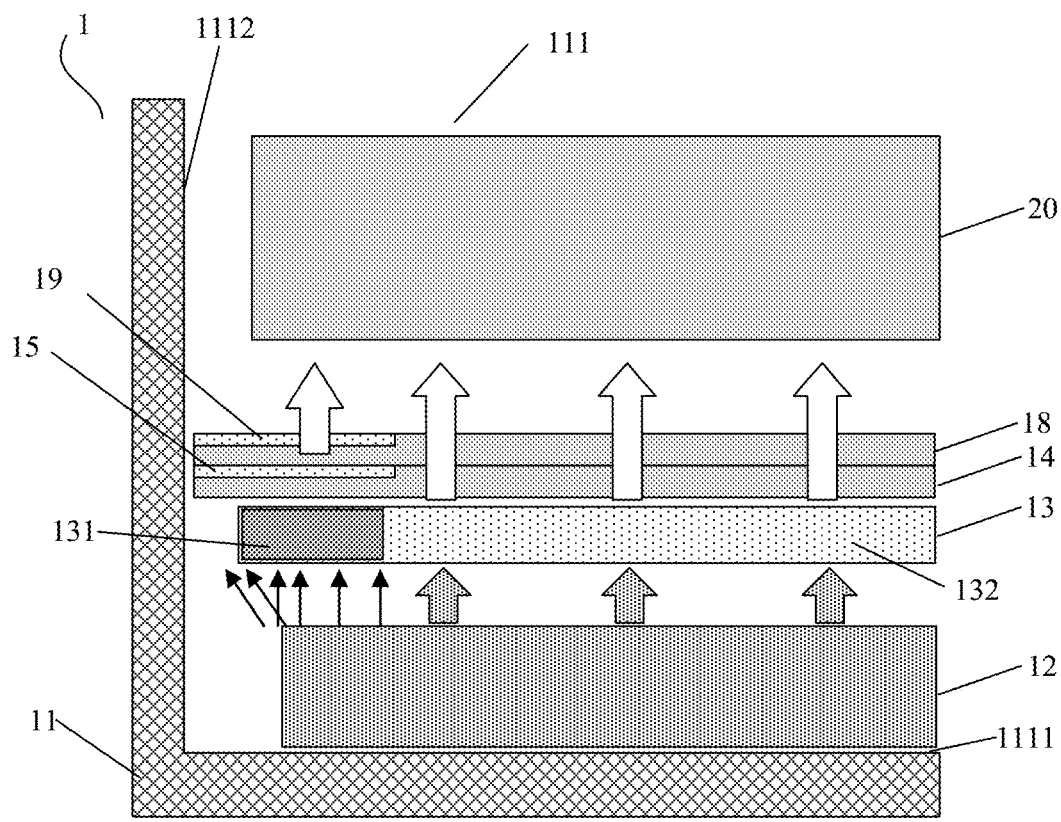
FIG. 6 is a schematic structural diagram of the backlight module according to an embodiment of the present disclosure.

FIG. 6 is a schematic structural diagram of the backlight module according to an embodiment of the present disclosure. As shown in FIG. 6, the backlight module 1 further includes a second light leveling layer 18. The second light leveling layer 18 is disposed on the side of the first light leveling layer 14 away from the first light conversion layer 13. A second target area of the second light leveling layer 18 is covered with a third light conversion layer 19, and the projection area of the third light conversion layer 19 on the first inner surface 1111 covers the projection area of the first area 131 on the first inner surface 1111.

In the embodiments of the present disclosure, the second light leveling layer 18 may be used to convert the granular light source into a surface light source, thereby serving the role of light mixing and light leveling. It should be noted that both the diffusing film and the light splitting film can achieve the functions of light mixing and light leveling, but the working principles of light mixing and light leveling of the diffusing film and the light splitting film are different.

In the embodiments of the present disclosure, the third light conversion layer 19 may be used to convert the light projected by the backlight light source 12 and passed through the second light conversion layer 15 into white light again through the photoluminescence effect, thereby enhancing the display brightness and further reducing light leakage. The third light conversion layer 19 may be a phosphor coating, and the third light conversion layer 19 may also be a quantum dot film coating. The third light conversion layer 19 may have an expansion and contraction rate. Therefore, a distance between the third light conversion layer 19 and the second inner surface 1112 of the receiving space 111 in the backlight module 1 may be reserved to avoid light conversion failure of the third light conversion layer 19 due to the expansion and contraction rate.

In the embodiments of the present disclosure, the first area 131 of the first light conversion layer 13 can be regarded as the failure area. The second light leveling layer 18 being disposed on the side of the first light leveling layer 14 away from the first light conversion layer 13, and the projection area of the third light conversion layer 19 on the first inner surface 1111 laid on the second target area of the second light leveling layer 18 covering the projection area of the first area 131 on the first inner surface 1111 may be understood as the second target area is positioned directly above the failure area, and the projection area of the second target area on the first inner surface 1111 is larger than the projection area of the failure area of the first light conversion layer 13 on the first inner surface 1111.

As shown in FIG. 6, the backlight module 1 further includes an optical film 20. The optical film 20 may include an upper brightness enhancement film and a lower brightness enhancement film (not shown in the accompanying drawings), where the upper brightness enhancement film and the lower brightness enhancement film may be stacked.

In the embodiments of the present disclosure, the backlight module 1 may include the receiving space 111. The receiving space 111 may be used to receive the backlight light source 12, the first light conversion layer 13, the first light leveling layer 14, the second light conversion layer 15, the plastic frame 16, the microstructure light-condensing element 17, the second light leveling layer 18, the third light conversion layer 19, and the optical film 20.

In the embodiments of the present disclosure, the optical film 20 may be used to improve the brightness of the backlight module. The optical film 20 may include an upper brightness enhancement film and a lower brightness enhancement film. When the light projected by the backlight light source 12 is converted into white light, the brightness of the backlight may be improved by stacking the lower brightness enhancement film and the upper brightness enhancement film.

The brightness enhancement film may be an optical film with a prism pattern precisely formed on the surface of PET with very good transparency by using acrylic resin. The brightness enhancement film may be disposed in front of the backlight source, and the light emitted by the light source may be concentrated in the direction of the user of the display device, which can improve the front brightness. The thickness of the brightness enhancement film can be relatively thin, such as 155 micrometers (μm), which has no effect on the thickness of the display device.

Figure 7:
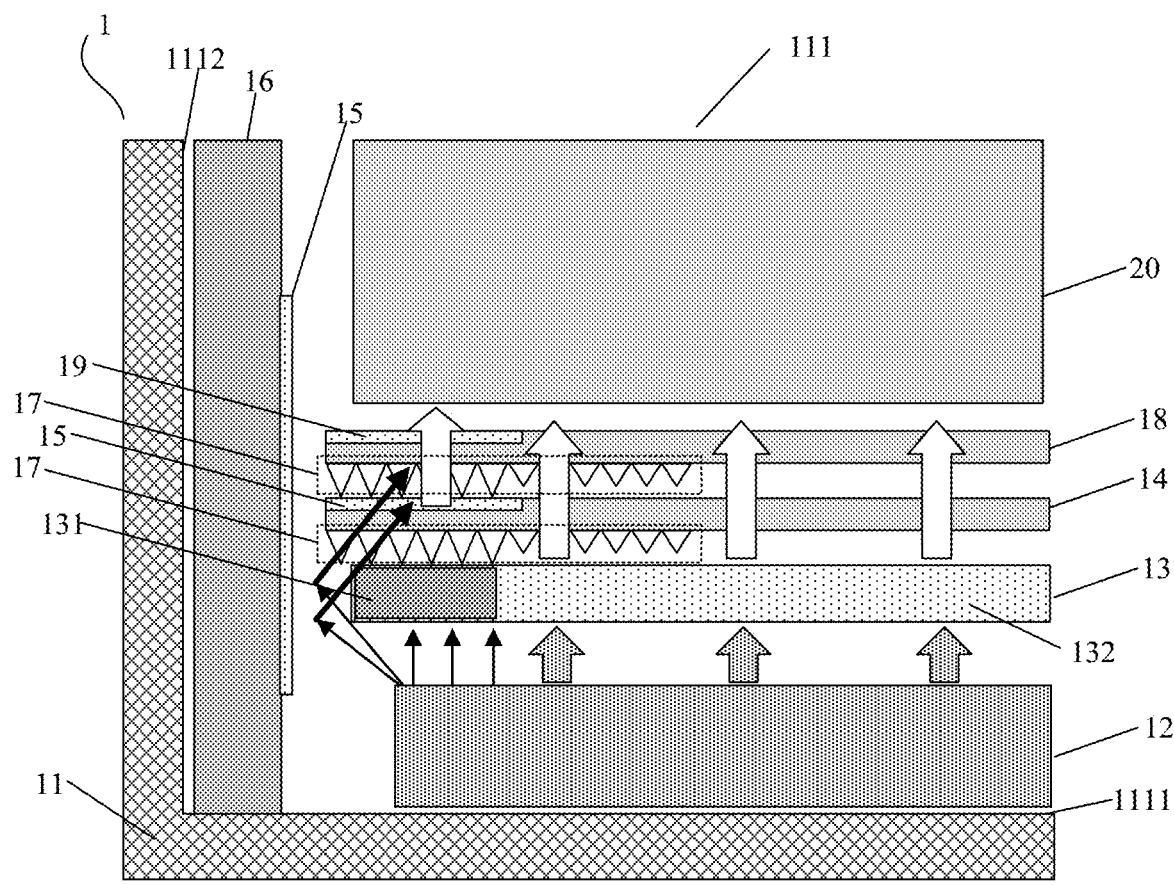
FIG. 7 is a schematic structural diagram of the backlight module according to an embodiment of the present disclosure.

FIG. 7 is a schematic structural diagram of the backlight module according to an embodiment of the present disclosure. As shown in FIG. 7, the backlight module 1 includes a backplane 11, a backlight light source 12, a first light conversion layer 13, and a first light leveling layer 14. The backplane 11 includes a receiving space 111, and the backlight light source 12 is fixed on a first inner surface 1111 of the receiving space 111. The first light conversion layer 13 is positioned on the light emitting side of the backlight light source 12, and there is a first distance between the first light conversion layer 13 and a second inner surface 1112 of the receiving space 111. In some embodiments, the first inner surface 1111 and the second inner surface 1112 may intersect to form a right angle. The first light leveling layer 14 is positioned on the side of the first light conversion layer 13 away from an outer surface of the backlight light source 12. Here, the first light leveling layer 14 is a single layer. A second light conversion layer 15 is laid on a first target area of the first light leveling layer 14. A projection area of the second light conversion layer 15 on the first inner surface 1111 covers a projection area of a first area 131 of the first light conversion layer 13 on the first inner surface 1111. The light conversion function of a second area 132 of the first light conversion layer 13 may be stronger than the light conversion function of the first area 131, and the second area 132 may include a different area from the first area 131 in the first light conversion layer 13.

In some embodiments, the backlight light source 12 may include a blue light source, the second light conversion layer 15 may include a red and green phosphor coating or a quantum dot film coating, and the first light conversion layer 13 may be a quantum dot film.

The backlight module 1 further includes a plastic frame 16. The plastic frame 16 is fixed on the second inner surface 1112, and the second light conversion layer 15 is laid on the side of the plastic frame 16 away from the receiving space 111.

The backlight module 1 further includes a microstructure light-condensing element 17. The microstructure light-condensing element 17 is fixed on the side of the first light leveling layer 14 close to the first light conversion layer 13. The light-condensing function of a first part 171 of the microstructure light-condensing element 17 may be stronger than the light-condensing function of a second part 172 of the microstructure light-condensing element 17. In some embodiments, the distance between the first part 171 and the second inner surface 1112 may be shorter than the distance between the second part 172 and the second inner surface 1112.

In some embodiments, the microstructure light-condensing element 17 may be a prism, and the size of the protrusion of the first part of the prism may be larger than the protrusion of the second part of the prism.

The backlight module 1 further includes a second light leveling layer 18. The second light leveling layer 18 is disposed on the side of the first light leveling layer 14 away from the first light conversion layer 13. A second target area of the second light leveling layer 18 is covered with a third light conversion layer 19, and the projection area of the third light conversion layer 19 on the first inner surface 1111 covers the projection area of the first area 131 on the first inner surface 1111.

A microstructure light-condensing element 17 is fixed on the side of the second light leveling layer 18 close to the first light leveling layer 14. The light-condensing function of a first part of the microstructure light-condensing element 17 may be stronger than the light-condensing function of a second part of the microstructure light-condensing element 17. In some embodiments, the distance between the first part and the second inner surface 1112 may be shorter than the distance between the second part and the second inner surface 1112.

The backlight module 1 further includes an optical film 20. The optical film 20 may include an upper brightness enhancement film and a lower brightness enhancement film (not shown in the accompanying drawings), where the upper brightness enhancement film and the lower brightness enhancement film may be stacked.

Consistent with the present disclosure, the blue light source can convert blue light into white light through the first light conversion layer 13. When the first light conversion layer 13 has a failure area, the blue light passing through the first light conversion layer 13, that is, the direct blue light, can pass through the second light conversion layer 15 of the first light leveling layer 14 again to generate a photoluminescence effect to obtain white light. Further, the reflected blue light generated by the first distance can pass through the second light conversion layer 15 laid on the plastic frame 16 to generate a photoluminescence effect to obtain white light. Subsequently, the third light conversion layer 19 laid on the second target area of the second light leveling layer 18 can produce a photoluminescence effect to obtain pure white light. Then, light leveling can be achieved through the prismatic condensing function. Finally, the light distribution can be more uniform by using the first light leveling layer 14 and the second light leveling layer 18. In this way, uniform light and uniform brightness in the visible area can be ensured, light leakage can be avoided, and the display effect can be improved.

Figure 8:
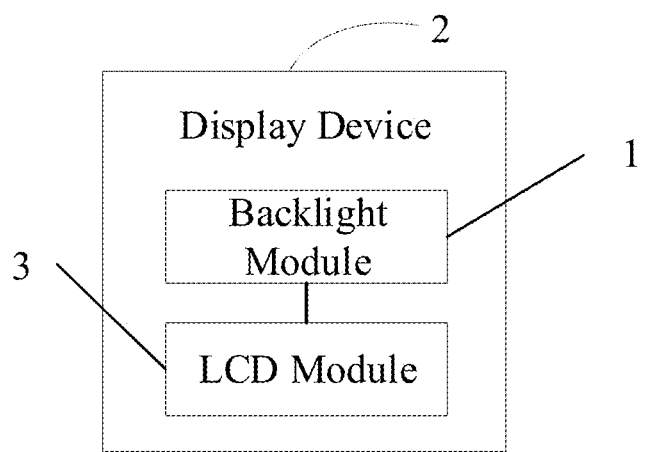
FIG. 8 is a schematic structural diagram of a display device according to an embodiment of the present disclosure.

An embodiment of the present disclosure provides a display device. FIG. 8 is a schematic structural diagram of a display device 2 according to an embodiment of the present disclosure. The display device 2 includes the backlight module 1, and a liquid crystal display module 3 disposed above the backlight module.

In the embodiments of the present disclosure, the backlight module 1 can be an assembly with a backplane, and the liquid crystal display module 3 can be assembled over the backlight module 1 to form the display device 2. Take a personal computer (PC) as an example. As the backplane of the PC, the backlight module can not only warp the liquid crystal display module, but also provide the backlight light source for the liquid crystal display module 3.

It is to be understood that phraseology and terminology used herein with reference to device or element orientation (such as, terms like "up", "down", "front", "rear", "left", "right", "vertical", "horizontal", "top", "bottom", "inside", "outside") are only used to simplify description of the present disclosure, and do not indicate or imply that the device or element referred to must have or operated in a particular orientation. They cannot be seen as limits to the present disclosure.

A person skilled in the art should understand that the phrases "one embodiment" or "an embodiment" referenced in this specification indicate that particular characteristics, structures, or features associated with that embodiment may be incorporated into at least one embodiment consistent with this disclosure. Therefore, the phrases "in one embodiment" or "in an embodiment" in this specification do not necessarily refer to the same embodiment. In addition, the described characteristics, structures, or features may be incorporated in one or more embodiments in any suitable manner. It should be understood that in various embodiments of the present disclosure, the sequence numbers of the above various processes or steps do not denote a preferred sequence of performing the processes or steps; and the sequence of performing the processes and steps should be determined according to the functions and internal logics thereof, which shall not cause any limitation to the implementation process of the embodiments of the present disclosure. The sequential numbers of the embodiments of the present disclosure are for description purpose only, and they do not denote preference of the embodiments.

It shall be understood that the devices and methods disclosed in the embodiments provided in the application may be implemented in other ways. The device embodiments described above are merely illustrative. For example, the division of units is merely a division based on logical functions and there may be other ways of division in real practice. For example, multiple units or components may be combined, or may be integrated into another system, or some features may be omitted or not performed. Additionally, coupling, direct coupling, or communication connections among the component parts as shown or discussed may be implemented through some interface(s), and indirect coupling or communication connections of devices or units may be in an electrical, mechanical, or other form.

The units described as separate components may or may not be physically independent of each other. The element illustrated as a unit may or may not be a physical unit, and it can be located at one place or deployed on a plurality of network units. A part or all of the units may be selected according to actual needs to achieve the objectives of the solutions of the embodiments.

In addition, the functional units in the various embodiments of the present disclosure may be integrated in one processing unit, or may exist as separate units respectively, or two or more units as described above may be integrated into one unit. The integrated unit may be practiced by means of a hardware, or may also be practiced in a form of a hardware and a software functional unit. Those of ordinary skill in the art may understand that all or part of the processes to implement the above-described method embodiments may be completed by program-instruction-related hardware. The above-described program may be stored in a computer-readable storage medium, and when the program is executed, the processes of the above-described method embodiments are executed. The above-described storage medium includes a mobile storage device, a ROM, a RAM, a magnetic disk, or an optical disk and other various media that can store program codes.

The features disclosed in product embodiments of the present disclosure may be combined arbitrarily without conflicts to obtain new product embodiments.

The above are only some specific embodiments of the present disclosure, and the protection scope of the present disclosure is not limited thereto. Variations or alterations that are within the technical scope as disclosed in the present disclosure and may be readily conceived by those skilled in the art shall fall within the protection scope of the present disclosure. Accordingly, the protection scope of the present disclosure is defined by the claims.

What is claimed is:

1. A backlight module comprising:
    a backplane including a first inner surface and a second inner surface at an angle to the first inner surface, the backplane including a receiving space defined by the first inner surface and the second inner surface;
    a first light conversion layer at least partially received within the receiving space, a first distance being arranged between the first light conversion layer and the second inner surface of the receiving space;
    a backlight light source, the backlight light source being fixed on the first inner surface of the receiving space, a second distance being arranged between the backlight light source and the second inner surface of the receiving space, the first light conversion layer including a quantum dot film being positioned on a light-emitting side of the backlight light source, the first distance being smaller than the second distance;
    a first light leveling layer, the first light leveling layer being positioned on a side of the first light conversion layer away from an outer surface of the backlight light source, wherein:
    a second light conversion layer is directly laid on a first target area of the first light leveling layer, and a projection area of the second light conversion layer on the first inner surface covers a projection area of a first area of the first light conversion layer on the first inner surface;
    a second area including an area of the first light conversion layer that is different from the first area in their respective light conversion functions;
    the first light leveling layer is multi-layered and includes a first sub-layer and a second sub-layer, the first and the second sub-layers are of a same material, the first target area of each of the first and the second sub-layers is covered with the second light conversion layer; and
    a third distance is arranged between the light leveling layer and the second inner surface of the receiving space, and the third distance is smaller than the first distance.

2. The backlight module of claim 1, wherein:
    the backlight light source includes a blue light source, and the second light conversion layer includes a red and green phosphor coating or a quantum dot film coating.

3. The backlight module of claim 1, wherein the second inner surface is covered with the second light conversion layer.

4. The backlight module of claim 1 further comprising:
    a plastic frame, the plastic frame being fixed on the second inner surface, a side of the plastic frame away from the second inner surface being covered by the second light conversion layer.

5. The backlight module of claim 1 further comprising:
    a microstructure light-condensing element fixed on a side of the first light leveling layer close to the first light conversion layer, a light condensing function of a first part of the microstructure light-condensing element being stronger than the light condensing function of a second part of the microstructure light-condensing element, wherein:
    a distance between the first part of the microstructure light-condensing element and the second inner surface is shorter than a distance between the second part of the microstructure light-condensing element and the second inner surface.

6. The backlight module of claim 5 further comprising:
    the microstructure light-condensing element includes a prism, and a protrusion of a first part of the prism is larger than a protrusion of a second part of the prism.

7. The backlight module of claim 1 further comprising:
a second light leveling layer, the second light leveling layer being disposed on a side of the first light leveling layer away from the first light conversion layer, a second target area of the second light leveling layer being covered with a third light conversion layer, a projection area of the third light conversion layer on the first inner surface covering the projection area of the first area on the first inner surface.

8. The backlight module of claim 1 further comprising:
an optical film, the optical film including an upper brightness enhancement film and a lower brightness enhancement film, wherein:
the upper brightness enhancement film and the lower brightness enhancement film are stacked.

9. A display device comprising a backlight module and a liquid crystal display module disposed on the backlight module, the backlight module including:
a backplane, the backplane including a receiving space defined by a first inner surface and a second inner surface at an angle to the first inner surface;
a first light conversion layer at least partially received within the receiving space, a first distance being arranged between the first light conversion layer and the second inner surface of the receiving space;
a backlight light source, the backlight light source being fixed on the first inner surface of the receiving space, a second distance being arranged between the backlight light source and the second inner surface of the receiving space, the first light conversion layer including a quantum dot film being positioned on a light-emitting side of the backlight light source, the first distance being smaller than the second distance;
a first light leveling layer, the first light leveling layer being positioned on a side of the first light conversion layer away from an outer surface of the backlight light source, wherein:
a second light conversion layer is laid on a first target area of the first light leveling layer, and a projection area of the second light conversion layer on the first inner surface covers a projection area of a first area of the first light conversion layer on the first inner surface;
a second area including an area of the first light conversion layer that is different from the first area in their respective light conversion functions;
the first light leveling layer is multi-layered and includes a first sub-layer and a second sub-layer, the first and the second sub-layers are of a same material, the first target area of each of the first and the second sub-layers is covered with the second light conversion layer; and
a third distance is arranged between the light leveling layer and the second inner surface of the receiving space, and the third distance is smaller than the first distance.

10. The backlight module of claim 1, wherein a thickness of the first light conversion layer is greater than a thickness of the second light conversion layer along a thickness direction.

11. The backlight module of claim 1, wherein a thickness of the first light leveling layer at the first target area is smaller than a thickness of the first light leveling layer at a second target area other than the first target area.

12. The backlight module of claim 11, wherein the first target area of the first light leveling layer is positioned between the second inner surface of the receiving space and the second target area of the first light leveling layer.

13. The display device of claim 9, wherein:
the backlight light source includes a blue light source, and the second light conversion layer includes a red and green phosphor coating or a quantum dot film coating.

14. The display device of claim 9, wherein
the second inner surface is covered with the second light conversion layer.

15. The display device of claim 9, wherein:
the backlight module further includes a plastic frame, the plastic frame being fixed on the second inner surface, a side of the plastic frame away from the second inner surface being covered by the second light conversion layer.

16. The display device of claim 9, wherein:
the backlight module further includes a microstructure light-condensing element fixed on a side of the first light leveling layer close to the first light conversion layer, a light condensing function of a first part of the microstructure light-condensing element being stronger than the light condensing function of a second part of the microstructure light-condensing element, wherein:
a distance between the first part of the microstructure light-condensing element and the second inner surface is shorter than a distance between the second part of the microstructure light-condensing element and the second inner surface.

17. The display device of claim 16, wherein:
the microstructure light-condensing element includes a prism, and a protrusion of a first part of the prism is larger than a protrusion of a second part of the prism.

18. The display device of claim 9, wherein:
the backlight module further includes a second light leveling layer, the second light leveling layer being disposed on a side of the first light leveling layer away from the first light conversion layer, a second target area of the second light leveling layer being covered with a third light conversion layer, a projection area of the third light conversion layer on the first inner surface covering the projection area of the first area on the first inner surface.

19. The display device of claim 9, wherein:
the backlight module further includes an optical film, the optical film including an upper brightness enhancement film and a lower brightness enhancement film, wherein:
the upper brightness enhancement film and the lower brightness enhancement film are stacked.

* * * * *